US011055063B2

(12) United States Patent
Goyal et al.

(10) Patent No.: US 11,055,063 B2
(45) Date of Patent: Jul. 6, 2021

(54) SYSTEMS AND METHODS FOR DEEP LEARNING PROCESSOR

(71) Applicant: Marvell Asia Pte, Ltd., Singapore (SG)

(72) Inventors: Rajan Goyal, Saratoga, CA (US); Ken Bullis, Los Altos, CA (US); Satyanarayana Lakshmipathi Billa, Sunnyvale, CA (US); Abhishek Dikshit, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 887 days.

(21) Appl. No.: 15/582,420

(22) Filed: Apr. 28, 2017

(65) Prior Publication Data
US 2017/0316312 A1    Nov. 2, 2017

Related U.S. Application Data

(60) Provisional application No. 62/330,824, filed on May 2, 2016.

(51) Int. Cl.
*G06F 7/523*        (2006.01)
*G06F 17/16*        (2006.01)
(Continued)

(52) U.S. Cl.
CPC ............ *G06F 7/523* (2013.01); *G06F 7/48* (2013.01); *G06F 17/16* (2013.01); *G06N 3/0454* (2013.01);
(Continued)

(58) Field of Classification Search
CPC . G06F 7/523; G06F 7/48; G06F 17/16; G06F 2207/4824; G06N 3/0454; G06N 3/063; G06N 3/082
See application file for complete search history.

(56) References Cited

U.S. PATENT DOCUMENTS 9,384,168 B2 * 7/2016 Mortensen ............ G06F 9/3893
10,438,117 B1 * 10/2019 Ross ........................ G06N 3/08
(Continued)

OTHER PUBLICATIONS

Gokhale, "Nn-X—a hardware accelerator for convolutional neural networks", Purdue university, 2014 (Year: 2014).*
(Continued)

*Primary Examiner* — Ann J Lo
*Assistant Examiner* — Van C Mang

(57) ABSTRACT

A hardware-based programmable deep learning processor (DLP) is proposed, wherein the DLP comprises with a plurality of accelerators dedicated for deep learning processing. Specifically, the DLP includes a plurality of tensor engines configured to perform operations for pattern recognition and classification based on a neural network. Each tensor engine includes one or more matrix multiplier (MatrixMul) engines each configured to perform a plurality of dense and/or sparse vector-matrix and matrix-matrix multiplication operations, one or more convolutional network (ConvNet) engines each configured to perform a plurality of efficient convolution operations on sparse or dense matrices, one or more vector floating point units (VectorFPUs) each configured to perform floating point vector operations, and a data engine configured to retrieve and store multi-dimensional data to both on-chip and external memories.

36 Claims, 7 Drawing Sheets

(51) Int. Cl.
- *G06N 3/08* (2006.01)
- *G06N 3/04* (2006.01)
- *G06N 3/063* (2006.01)
- *G06F 7/48* (2006.01)

(52) U.S. Cl.
CPC ............ *G06N 3/063* (2013.01); *G06N 3/082* (2013.01); *G06F 2207/4824* (2013.01)

(56) References Cited

U.S. PATENT DOCUMENTS

| | | |
|---|---|---|
| 2002/0198911 A1 | 12/2002 | Blomgren et al. |
| 2015/0039856 A1 | 2/2015 | Pitsianis et al. |
| 2017/0132496 A1* | 5/2017 | Shoaib .................... G06K 9/66 |

OTHER PUBLICATIONS

Han "Deep Compression: Compressing Deep Neural Networks with Pruning, Trained Quantization and Huffman Coding", 2014 (Year: 2016).*
Liu, "Sparse Convolutional Neural Networks", 2015 (Year: 2015).*
Mahale, "VOP: Architecture of a Processor for Vector Operations in On-line Learning of Neural Networks", IEEE, 2016 (Year: 2016).*
Masakazu Tanomoto "A CGRA-based Approach for Accelerating Convolutional Neural Networks", IEEE, 2015 (Year: 2015).*
Zavier Glorot "Deep Sparse Rectifier Neural Networks", 2011 (Year: 2011).*
Gokhale, et al. A 240 G-ops/s Mobile Coprocessor for Deep Neural Networks, CVPR2014 Workshop pp. 682-687 Year 2014.

* cited by examiner

SYSTEMS AND METHODS FOR DEEP LEARNING PROCESSOR

CROSS-REFERENCE TO RELATED APPLICATIONS

This application claims the benefit of U.S. Provisional Patent Application No. 62/330,824, filed May 2, 2016, and entitled "SYSTEMS AND METHODS FOR DEEP LEARNING PROCESSOR," which is incorporated herein in its entirety by reference.

BACKGROUND

Deep learning is a type of machine learning that utilizes a cascade of layers of nonlinear processing units for feature extraction and transformation. Deep learning has many potential applications including but not limited to, computer vision for robotics and self-driving cars, which includes image search, capture, classification, and face detection; natural language processing, which includes text analytics, machine translation, language models, and sentiment analysis; speech and emotion understanding, which includes voice search, voice activated assistant, dialog and conversation; enterprise applications and security, which includes malware detection/clutter classification, fraud detection, recommendation systems, and advertising; and cognitive computing and artificial intelligence, which includes decision support and recommendation systems.

Deep learning typically involves two phases, training, which uses a rich set of training data to train a plurality of machine learning models, and inference, which applies the trained machine learning models to actual applications. Each of the two phases pose a distinct set of requirements for its underlying infrastructures. Specifically, the training phase focuses on graphics processing unit (GPU) infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (ROI) efficiency. Given the growing gap between the number and varieties of deep learning applications needed to be performed and top of the line capacity of computing resources (e.g., CPUs) available, there is an increasing need for an inference solution that delivers both performance and efficiency for accelerated deep learning computation.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
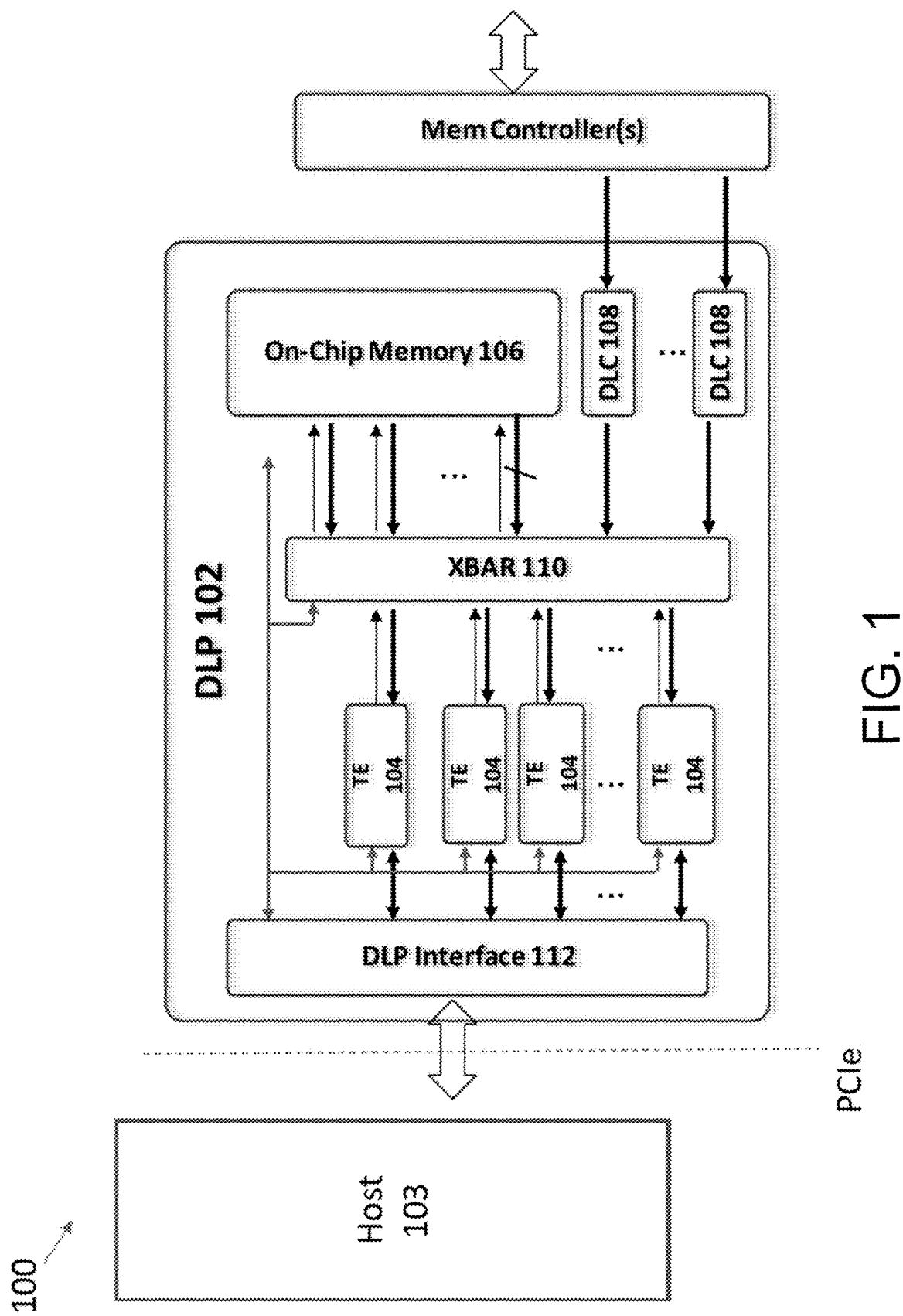
FIG. 1 depicts an example of a diagram of a system 100 configured to support hardware-based deep learning processing in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A hardware-based programmable deep learning processor (DLP) is proposed, wherein the DLP comprises with a plurality of accelerators dedicated for deep learning processing. Specifically, the DLP includes a plurality of tensor engines configured to perform operations for pattern recognition and classification based on a neural network. Each tensor engine includes one or more matrix multiplier (MatrixMul) engines each configured to perform a plurality of dense and/or sparse vector-matrix and matrix-matrix multiplication operations, one or more convolutional network (ConvNet) engines each configured to perform a plurality of efficient convolution operations on sparse or dense matrices, one or more vector floating point units (VectorFPUs) each configured to perform floating point vector operations, and a data engine configured to retrieve and store multi-dimensional (e.g., 2D) data to both on-chip and external memories.

Unlike GPUs designed for handling large batches of data, which are expensive, power consuming, and inefficient for inference, and field programmable gate arrays (FPGAs), which have a fixed primitive pipeline that is difficult to fit into an existing software programming paradigm, the proposed DLP is optimized for the inference phase of deep learning processing to achieve capital and operational efficiency at, for example, data centers. Compared to the GPUs and FPGAs, the proposed DLP is fully programmable using existing tools and workflows and it achieves high performance and high energy efficiency with balanced allocation of computing and memory resources. In addition, the DLP runs a complete pipeline of deep learning processing/operations offloaded from a host/computing device, which only needs to invoke the DLP via a simple application program interface (API) call without any further instructions/handholding of the DLP. As such, the DLP frees the host for other processing tasks.

FIG. 1 depicts an example of a diagram of a system 100 configured to support hardware-based deep learning processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a hardware-based programmable deep learning processor (DLP) 102, wherein the DLP 102 further includes at least a plurality of tensor engines (TEs) 104, which are dedicated hardware blocks/components each including one or more microprocessors and on-chip memory units storing software instructions programmed by a user for various machine learning operations. When the software instructions are executed by the microprocessors, each of the hardware components becomes a special purposed hardware component for practicing certain deep learning functions as discussed in detail below. The DLP 102 further includes an on-system/on-chip memory (OSM) 106 and one or more deep learning controllers (DLCs) 108 configured to access a plurality of external memory resources (e.g., DRAMs) through multiple input/output channels via memory controller(s).

During its operation, the DLP 102 is configured to accept instructions from a host 103 and submit the instructions to the tensor engines 104 and their respective components in the DLP 102 via a DLP interface 112. In some embodiments, the host 103 is configured to provide separate instructions to each of the components of the DLP 102, wherein formats of the instructions are different for different components. The DLP 102 is also configured to provide deep learning processing results by the DLP 102 back to the host 103 via the DLP interface 112. Here, the host 103 can be, but is not limited to, an x86, MIPS, or ARM based device/system/server. The interface between the DLP 102 and the host 103 can be but is not limited to a Peripheral Component Interconnect Express (PCIe) bus.

Figure 2:
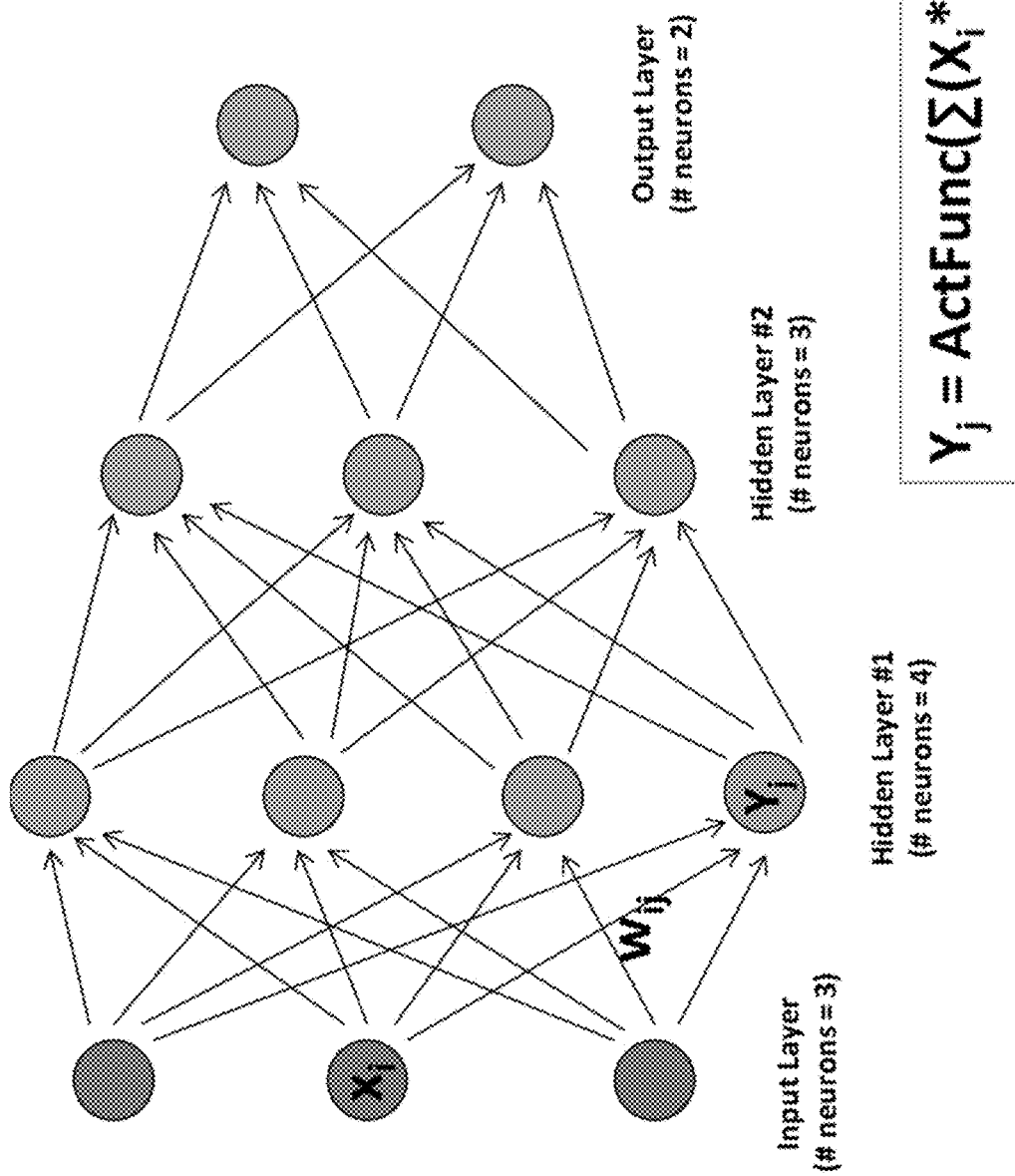
FIG. 2 depicts an example of a neural network, which includes a plurality of layers in accordance with some embodiments.

For deep learning processing, the DLP 102 is configured to implement one or more neural networks, which are mathematical models that mirror functions of a human brain and are utilized for pattern recognition and classification. Neural networks are typically applied to image/video processing, speech recognition, computer vision, optical character recognition, speech to text, machine translation, search, query to doc relevance, etc. FIG. 2 depicts an example of a neural network, which includes a plurality of layers, e.g., an input layer, an output layer and multiple hidden layers between them, wherein each layer has a plurality of neurons connecting to neurons on a neighboring layer with information/data processed progressing from one layer to next in sequence along a processing pipeline. As shown by the example of FIG. 2, there are three stages in the processing pipeline for each layer of a fully connected (FC) neural network—multiplication of neuron inputs Xi of a layer with weights Wij, addition of multiplication results and bias vector Bj, and application of an activation function to produce an output Yj to the next layer in the pipeline according to the following equation:

$$Y_j = \text{ActFunc}(\Sigma(X_i * W_{ij}) + B_j)$$

Note that the configuration (e.g., number of layers, number of neurons on each layer, and the connections among the neurons) of the neural network is not fixed and is dynamically adjusted based on the deep learning applications of the DLP 102.

Figure 3:
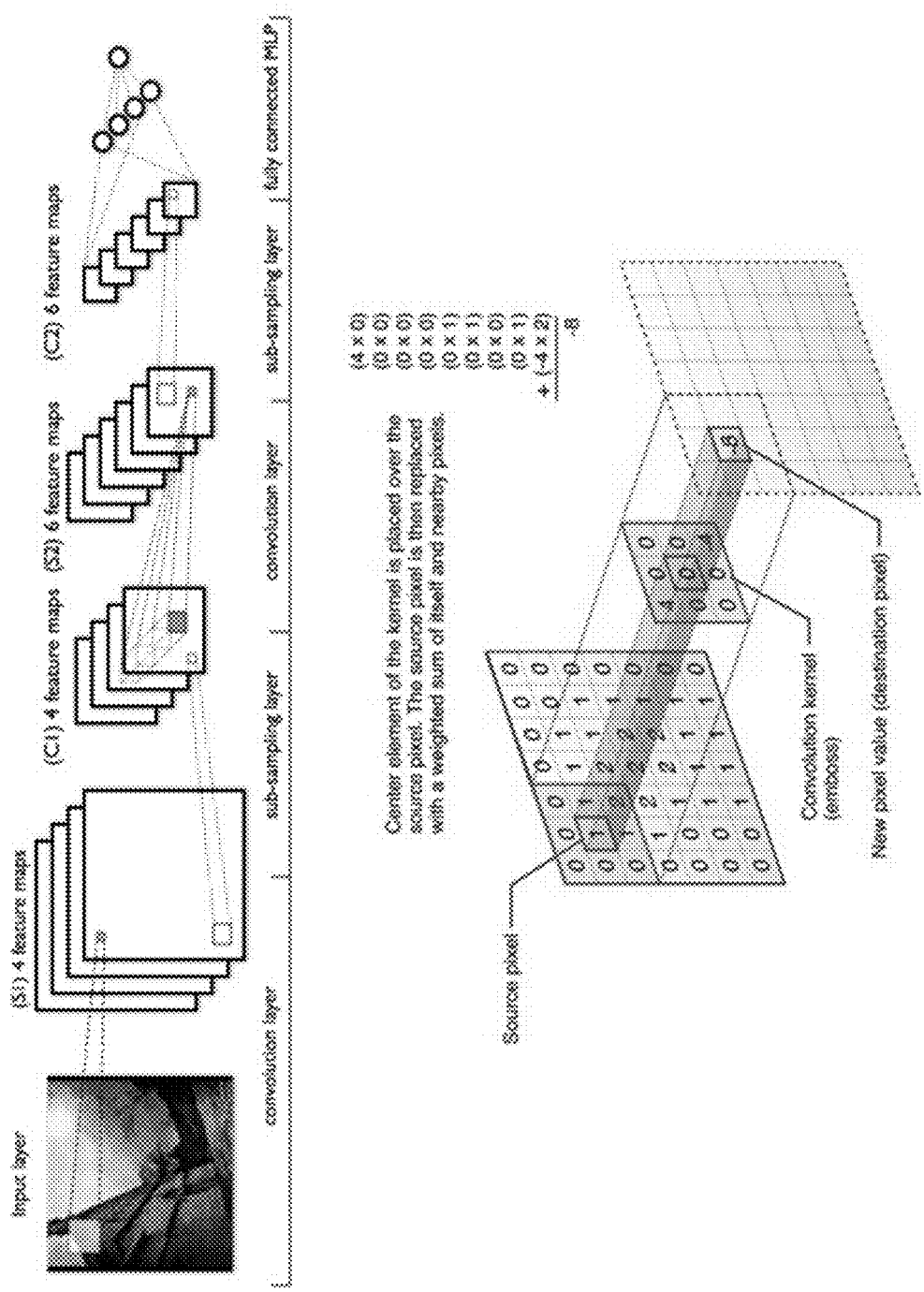
FIG. 3 depicts an example of a convolutional neural network for pattern recognition and classification in accordance with some embodiments.

For pattern recognition and classification, e.g., image pattern recognition, a convolutional neural network for convolution operations on input data may have three types of layers—one or more convolutional layers, each of which is configured to apply one or more local filters and/or a non-linear activation function to data from the input layer, one or more pooling (or sub-sampling) layers, each of which is configured to aggregate information/data amongst a set of neighbors of a neuron of the current layer, and one or more classification layers, each of which is configured to perform a linear or multi-layer perceptron (MLP) operation on the FC neural network and apply a non-linear activation function to output from the neuron. In any of the network layers, the non-linear activation function can be implemented as linear interpolation of the function. FIG. 3 depicts an example of a convolutional neural network for pattern recognition and classification. When such a convolutional neural network is applied to, for a non-limiting example, an image, one or more kernels are applied to the source pixels on the image for convolution, wherein the center element of each kernel is placed over the source pixel to replace the source pixel with a weighted sum of itself and its neighboring pixels. Here, each kernel is a multi-dimensional (e.g., three- or four-dimension) matrix or template having its own values for elements in the matrix, wherein the dimensions represent (x, y, time) coordinates as well as depth (e.g., color) of the elements of the kernel.

Operations for pattern recognition and classification, which involve a lot of multiplication operations as shown by the description above, count for most of computations measured in terms of floating point operations per second (FLOPS) for deep learning. In the example of FIG. 1, the DLP 102 adopts a multi-core structure and partitions each neural network processing task for pattern classification among a plurality of tensor engines (TEs) 104, wherein each tensor engine 104 is configured to perform a portion/subtask of the neural network processing task in parallel. Here, each of the plurality of tensor engines 104 is fully programmable and is configured to retrieve and process input data from the OSM 106 and/or the external memory resources via the DLCs 108, wherein the retrieved data is multiplexed to the tensors engines 104 by a multiplexer/crossbar 110. In some embodiments, the DLP 102 is configured to replicate a sub-task among multiple tensor engines 104 or move a sub-task from one tensor engine 104 to another for efficient use of compute resources. The DLP 102 is configured to distribute the sub-tasks among the tensor engines 104 under both scenarios where the number of sub-tasks is greater than the number of tensor engines 104 and where the number of sub-tasks is fewer than the number of tensor engines 104. For a non-limiting example, a large size image can be broken into a plurality of smaller image portions, wherein the size of each of the image portions matches with the input data width of one tensor engine 104 and is handled by each tensor engine 104.

Figure 4:
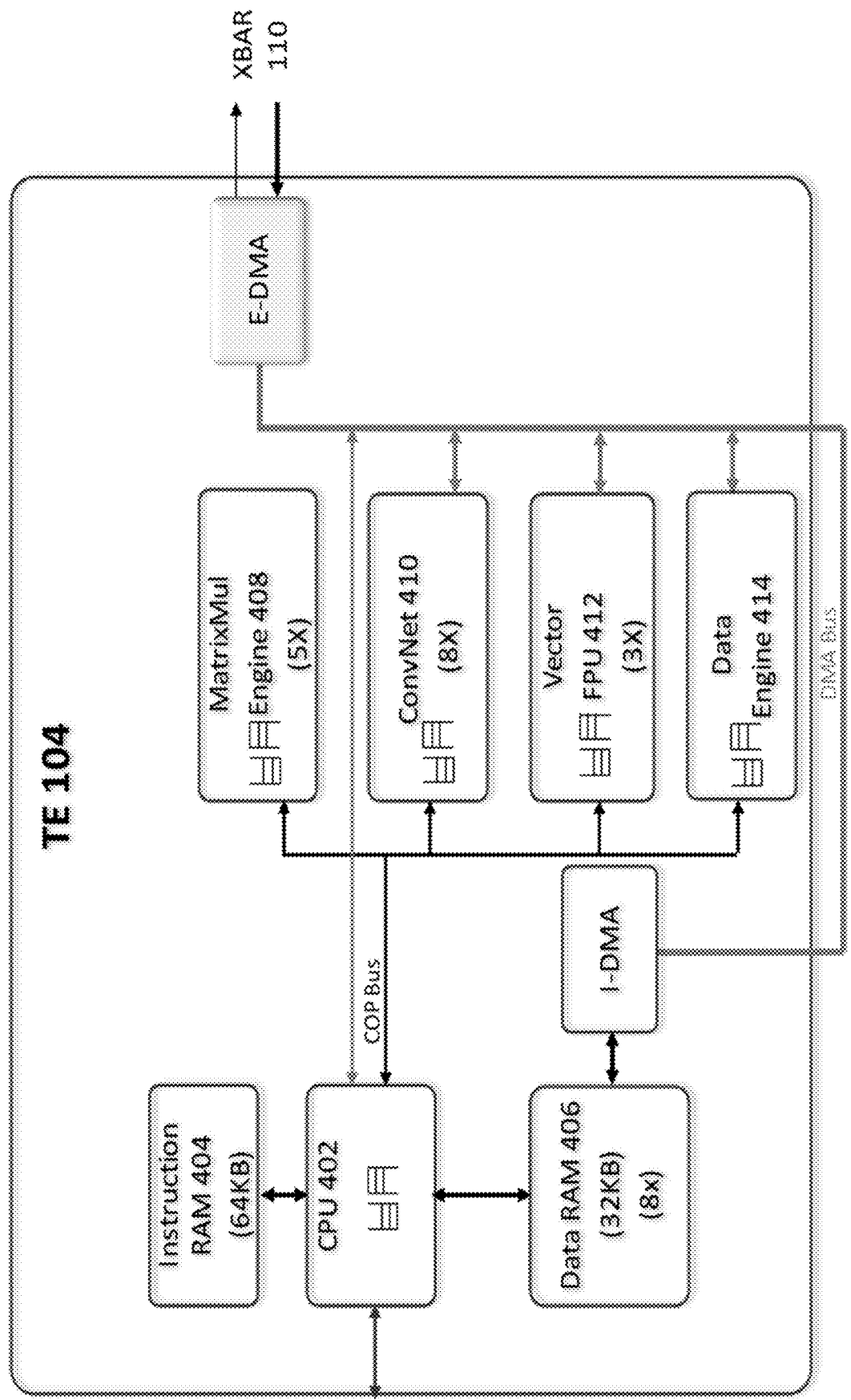
FIG. 4 depicts an example of a block diagram of key components of each tensor engine in accordance with some embodiments.

FIG. 4 depicts an example of a block diagram of key components of each tensor engine 104. As shown by the example of FIG. 4, the tensor engine 104 includes a fully programmable CPU 402 having its own instruction RAM/cache 404 and data RAM/cache 406 configured to store instructions from the host 103 and retrieved data from the OSM 106 and external memory resources, respectively.

Each tensor engine 104 further includes at least four types of hardware engines for accelerated computation on data at each layer of the neural network—one or more matrix multiplier (MatrixMul) engines 408 each configured to perform a plurality of dense and/or sparse vector-matrix and/or matrix-matrix multiplication operations, one or more convolutional network (ConvNet) engines 410 each configured to explore and utilize sparsity of the vectors and/or matrices for efficient convolution operations, one or more vector floating point units (Vector FPUs) 412 each configured to perform floating point vector operations on multiple data segments/vectors per single instruction, and a data engine 414 configured to support prefetching of one or multi-dimensional (e.g., 2D) data from the OSM 106 and/or the external memory resources via direct memory access (DMA). In some embodiments, each Vector FPU 412 is a simplified arithmetic-logic unit (ALU) that handles vector operations only and does not handle loops, branches, and branch predictions to achieve power efficiency.

Figure 5:
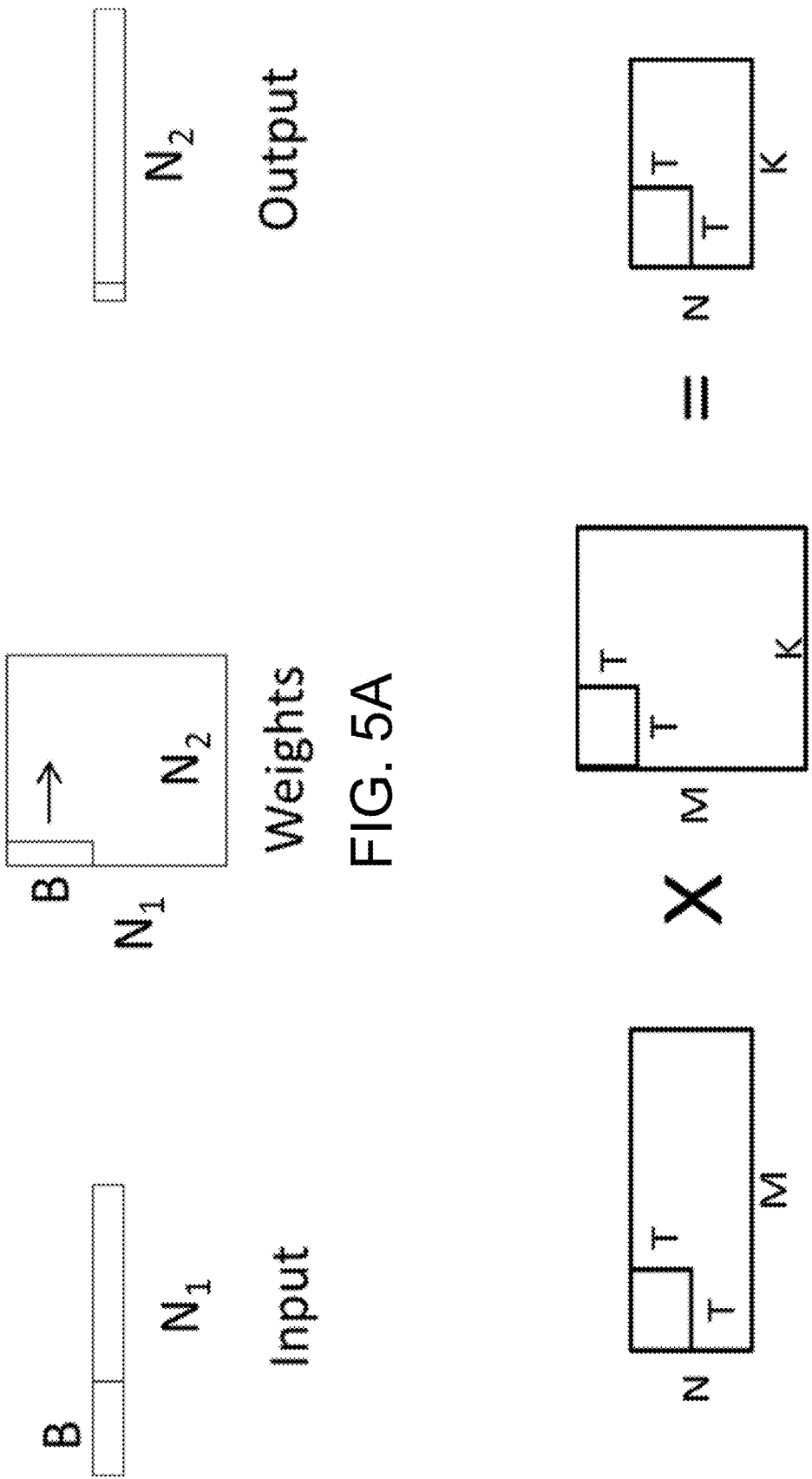
FIG. 5A depicts an example of vector-matrix multiplication in accordance with some embodiments.
FIG. 5B depicts an example of matrix-matrix multiplication in accordance with some embodiments.

In the example of FIG. 4, each MatrixMul engine 408 is configured to perform one or more of: multiplication between a dense vector/matrix and a dense matrix, multiplication between a sparse vector (in dense form) and a dense matrix, and multiplication between a sparse vector (in dense form) and a sparse matrix (in sparse form). Here, a sparse vector or matrix has most of its elements as zero, while a dense vector or matrix has most of its elements as nonzero. FIG. 5A depicts an example of vector-matrix multiplication wherein the vector in dense form of length $N_1$ is read only once in blocks of size B each. The weight matrix W of $N1 \times N2$ is stored in column major form, wherein corresponding weights for the vector are also read once in blocks of size B at a time first from the first column and then from the second column, etc. Each time a block of weights is read from the weight matrix, they are multiplied element-wise with the block of the vector, summed, and added by the MatrixMul engine 408 as a partial sum to the corresponding output value, which is updated N1/B times during the vector-matrix multiplication. FIG. 5B depicts an example of matrix-matrix multiplication wherein, at each iteration, a $T \times T$ submatrix (or tile) of an $M \times N$ input matrix is multiplied by a $T \times T$ submatrix of a $M \times K$ weight matrix by the MatrixMul engine 408, yielding a $T \times T$ partial-sum submatrix of a $N \times K$ output matrix. During the matrix-matrix multiplication, input matrix and the weight matrix are first traversed along M followed by the weight matrix and the output matrix traversed along K. Finally, the input matrix and the output matrix are traversed along N. During the entire process, the weight matrix is read N/T times and the input matrix is read K/T times while the output matrix is written/stored only once to the memory.

In some embodiments, the MatrixMul engine 408 in each tensor engine 104 is configured to achieve efficient vector-matrix multiplication by minimizing or avoiding data movement for multiplication between a sparse vector and a dense or sparse matrix, wherein only data that corresponds to non-zero values in the sparse vector is loaded into memory 406 of the tensor engine 104 upon request. For scalable matrix-matrix multiplication, the DLP 102 is configured to partition a large dense or sparse matrix into smaller portions and distribute the portions of the matrix across multiple tensor engines 104. In some embodiments, separate Compressed Sparse Row (CSR) or Compressed Sparse Column (CSC) Format can be adopted for the corresponding portion of the large matrix distributed to each of the tensor engines 104. The MatrixMul engine 408 of each tensor engine 104 is then configured to perform a matrix-matrix multiplication on its corresponding portion of the partitioned matrix to speed up the matrix-matrix multiplication.

Figure 6:
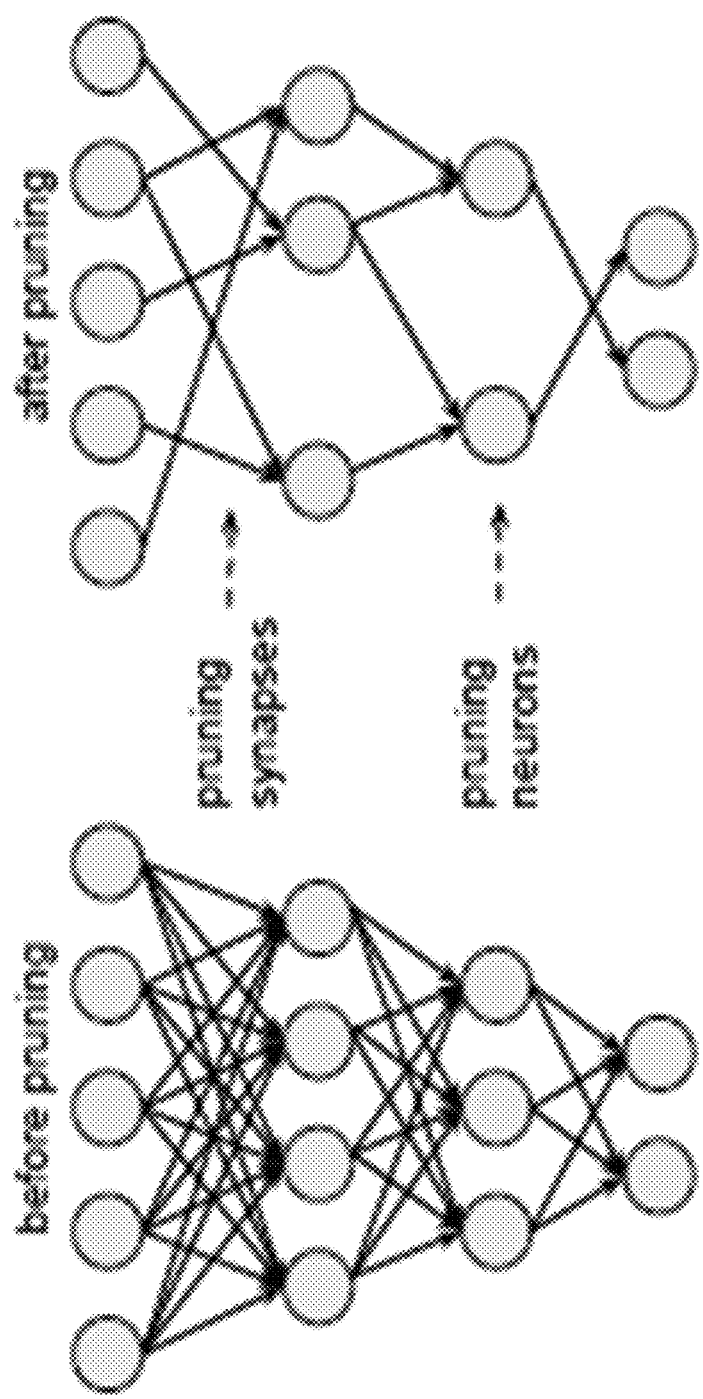
FIG. 6 depicts an example of a neural network before and after pruning in accordance with some embodiments.

In some embodiments, the DLP 102 is configured to trim a fully connected (FC) neural network to reduce the size of the vectors and/or matrices to be multiplied by the MatrixMul engine 408 and thus the data that needs to be read from the memory. Starting with the FC neural network, the DLP 102 is configured to prune neurons at layers of the FC neural network as well as edges/arcs connecting the neurons of different layers to create a compact/sparse neural network while maintaining accuracy of the neural network. FIG. 6 depicts an example of a neural network before and after pruning.

In the example of FIG. 4, the ConvNet engine 410 in each tensor engine 104 is configured to explore sparsity of the vectors and/or matrices across the spectrum of various convolution layers of the neural network for efficient convolution. During convolution on the network, a rectified linear unit (ReLU), which applies an activation function defined as $f(x)=\max(0, x)$ where x is an input to a neuron, is widely used. As a result of such ReLU application, the resulting/output matrices become increasingly sparse as the data processes along the processing pipeline. The ConvNet engine 410 is configured to take advantage of sparsity in the output matrices of the layers of the neural network by not performing any computation on the zero values in the vectors and/or matrices to save on power and latency. In some embodiments, the ConvNet engine 410 is also configured to choose kernels of small size but having input channels of large bandwidth instead of using large kernels with small input channels.

Figure 7A:
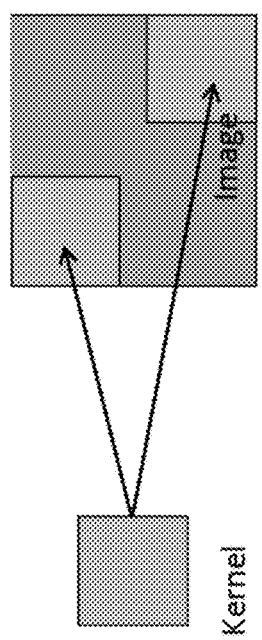
FIG. 7A depicts an example of kernel reuse in accordance with some embodiments.
Figure 7B:
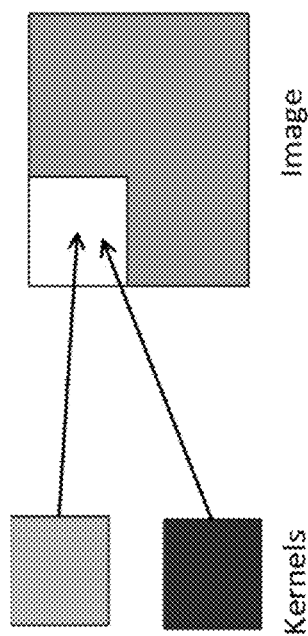
FIG. 7B depicts an example of image reuse in accordance with some embodiments.
Figure 7C:
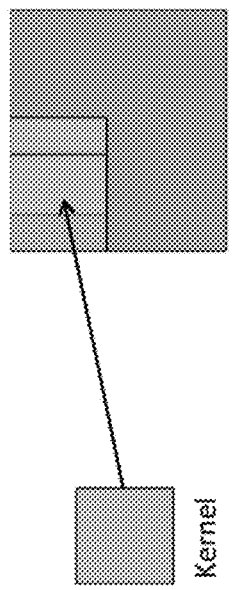
FIG. 7C depicts an example of stride reuse in accordance with some embodiments.

Once data is loaded into memory 406 of each tensor engine 104, the tensor engine 104 is configured to reuse data in memory across one or more ConvNet engines 410 efficiently to avoid or minimize data movement (e.g., unnecessary read and/or write to memory) during convolution operations. FIG. 7A depicts an example of kernel reuse, wherein a same kernel is kept and repeatedly applied by the ConvNet engines 410 on different parts of the data (e.g., image) at each convolution layer wherein the kernel is loaded into the memory only once during convolution instead of being reloaded again and again for different ConvNet engines 410. FIG. 7B depicts an example of image reuse, wherein different kernels can be applied to the same portion of the image data by the ConvNet engines 410 at each convolution layer wherein that specific portion of the image has already been loaded into the memory and does not need to be reloaded again during convolution. FIG. 7C depicts an example of stride reuse, wherein when a kernel is applied to two portions of the data (e.g., image) in stride and the two data portions overlap, the convolution output by the kernel on the overlapping part of the portions is saved and reused by the ConvNet engines 410 without the need to be calculated again at each convolution layer.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable deep learning processor (DLP), comprising:
    an on-system memory (OSM) and one or more controllers configured to access a plurality of external memory resources via direct memory access (DMA);
    a plurality of programmable tensor engines configured to perform a plurality of operations on input data to generate deep learning processing results for pattern recognition and classification based on a neural network, wherein at least one or more programmable tensor engine of the plurality of tensor engines further comprises a plurality types of hardware engines to accelerate the operations on data at one or more layers of the neural network, wherein the types of hardware engines include:
    one or more matrix multiplier engines configured to perform a plurality of dense and/or sparse vector-matrix and matrix-matrix multiplication operations, and wherein the one or more of the matrix multiplier engines is configured to reduce the number of times the input data and a weight matrix need to be read and/or the output matrix needs to be written at the one or more layers of the neural network, wherein in a matrix-matrix multiplication operation an input matrix associated with the input data is N rows by M columns and the weight matrix associated therewith is M rows by K columns, and wherein a T row by a T column submatrix of the input matrix is multiplied by a T row by a T column submatrix of the weight matrix, and wherein the input matrix is read K/T times and wherein the weight matrix is read N/T times;
    one or more convolutional network engines configured to perform a plurality of convolution operations by applying a function to increase a sparsity of the vectors and/or matrices, and wherein the one or more convolutional network engines is configured to reduce a number of computations on zero values of the vectors and/or matrices;
    one or more vector floating point units configured to perform a vector operation in floating point format;
    a data engine configured to prefetch the input data from the OSM and/or the external memory resources.

2. The processor of claim 1, wherein:
    the DLP is configured to multiplex the data prefetched from the OSM and/or the external memory resources to the at least one or more programmable tensor engine of the plurality of tensors engines via a crossbar.

3. The processor of claim 2, wherein:
    the at least one or more programmable tensor engine of the plurality of tensor engines further includes a programmable CPU having its own instruction RAM and data RAM configured to store instructions from a host and the retrieved data from the OSM and/or the external memory resources, respectively.

4. The processor of claim 3, wherein:
    the DLP is configured to accept a plurality of instructions from the host and submit the instructions to the at least one or more programmable tensor engine of the plurality of tensor engines and their respective components in the DLP via a DLP interface, wherein the instructions are stored in the instruction RAM of the tensor engines.

5. The processor of claim 3, wherein:
    the DLP is also configured to provide the deep learning processing results by the DLP back to the host via the DLP interface.

6. The processor of claim 1, wherein:
    the configuration of the neural network is dynamically adjusted based on current deep learning application of the DLP.

7. The processor of claim 1, wherein:
    the neural network includes a plurality of layers each having a plurality of neurons connecting to neurons on a neighboring layer, wherein data processed progresses from one layer to the next in sequence along a processing pipeline.

8. The processor of claim 7, wherein:
    the DLP is configured to trim the neural network by pruning the neurons at each layer of the neural network as well as edges connecting the neurons of different layers to create a compact neural network while maintaining accuracy of the neural network to reduce size of the vectors and/or the matrices to be multiplied by the matrix multiplier engines and the data that needs to be read from the memory.

9. The processor of claim 7, wherein:
    the neural network utilized for convolution operations has three types of layers:
        one or more convolutional layers, each of which is configured to apply one or more local filters and/or a non-linear activation function to data from the input layer,
        one or more sub-sampling layers, each of which is configured to aggregate information amongst a set of neighbors of a neuron of the layer;
        one or more classification layers, each of which is configured to perform a linear or multi-layer perceptron (MLP) operation on the neural network and apply a non-linear activation function to output from the neuron.

10. The processor of claim 9, wherein:
    one or more kernels are applied to source pixels in an image for image classification, wherein a center element of each kernel is placed over a source pixel to replace the source pixel with a weighted sum of the source pixel and its neighboring pixels.

11. The processor of claim 10, wherein:
    each kernel is a multi-dimensional matrix having its own values for elements in the matrix, wherein the dimensions represent (x, y, time) coordinates as well as depth of the elements of the kernel.

12. The processor of claim 1, wherein:
    the DLP is configured to partition each operation for pattern classification among the plurality of tensor engines, wherein the at least one or more programmable tensor engines of the plurality of programmable tensor engines is configured to perform a sub-task of the operation in parallel.

13. The processor of claim 12, wherein:
    the DLP is configured to replicate a sub-task among multiple tensor engines or move a sub-task from one tensor engine to another for efficient use of compute resources.

14. The processor of claim 1, wherein:
    each of the vector floating point units is a simplified arithmetic-logic unit (ALU) that handles on vector operations only and does not handle loops, branches, and branch predictions.

15. The processor of claim 1, wherein:
    the one or more of the matrix multiplier engines is configured to perform one or more of: multiplication between a dense vector or matrix and a dense matrix, multiplication between a sparse vector and a dense matrix, and multiplication between a sparse vector and a sparse matrix, wherein a sparse vector or matrix has more zero elements than nonzero elements, while a dense vector or matrix has more nonzero elements than zero elements.

16. The processor of claim 1, wherein:
the one or more of the matrix multiplier engines is configured to reduce data movement associated with multiplication involving a sparse vector, wherein only data that corresponds to non-zero values in the sparse vector is loaded into the memory of the tensor engine upon request.

17. The processor of claim 1, wherein:
the at least one or more programmable tensor engines of the plurality of tensor engines is configured to reuse data in the memory across one or more of the convolutional network engines efficiently to reduce data movement for read and/or write to memory during the convolution operations.

18. The processor of claim 17, wherein:
the one or more convolutional network engines is configured to keep and repeatedly apply a same kernel on different parts of the input data at the at least one or more layers of the neural network wherein the kernel is loaded into the memory only once during the convolution operations.

19. The processor of claim 17, wherein:
the one or more convolutional network engines is configured to apply different kernels to the same portion of the input data at the at least one or more layers of the neural network, wherein that specific portion of the input data has already been loaded into the memory and does not need to be reloaded again during the convolution operations.

20. The processor of claim 17, wherein:
the at least one or more convolutional network engines is configured to save and reuse convolution output by a kernel on an overlapping part of two portions of the input data without calculating the output again at the at least one or more convolution layers when the kernel is applied to the two portions of the data in stride and the two data portions overlap.

21. A method to support hardware-based deep learning processing, comprising:
prefetching input data from an on-system memory (OSM) and/or a plurality of external memory resources via direct memory access (DMA);
performing a plurality of operations on input data to generate deep learning processing results for pattern recognition and classification based on a neural network, wherein the convolution operations on data at one or more layers of the neural network are accelerated by a plurality of types of hardware engines to:
  perform a plurality of dense and/or sparse vector-matrix and matrix-matrix multiplication operations, wherein in a matrix-matrix multiplication operation an input matrix associated with the input data is N rows by M columns and a weight matrix associated therewith is M rows by K columns, and wherein a T row by a T column submatrix of the input matrix is multiplied by a T row by a T column submatrix of the weight matrix, and wherein the input matrix is read K/T times and wherein the weight matrix is read N/T times;
  perform a plurality of convolution operations by applying a function to increase a sparsity of the vectors and/or matrices, and by reducing a number of computations on zero values of the vectors and/or matrices;
  perform a vector operation in floating point format;
outputting deep learning processing results for pattern recognition and classification to a host.

22. The method of claim 21, wherein:
the neural network includes a plurality of layers each having a plurality of neurons connecting to neurons on a neighboring layer, wherein data processed progresses from one layer to the next in sequence along a processing pipeline.

23. The method of claim 22, further comprising:
trimming the neural network by pruning the neurons at the at least one or more layers of the neural network as well as edges connecting the neurons of different layers to create a compact neural network while maintaining accuracy of the neural network to reduce the size of the vectors and/or the matrices to be multiplied and the data that needs to be read from the memory.

24. The method of claim 21, further comprising:
applying one or more local filters and/or a non-linear activation function to data from an input layer of the neutral network;
aggregating information amongst a set of neighbors of a neuron of the layer;
performing a linear or multi-layer perceptron (MLP) operation on the neural network and apply a non-linear activation function to output from the neuron.

25. The method of claim 24, further comprising:
applying one or more kernels to source pixels in an image for image classification, wherein the center element of each kernel is placed over a source pixel to replace the source pixel with a weighted sum of the source pixel and its neighboring pixels and each kernel is a multi-dimensional matrix having its own values for elements in the matrix, wherein the dimensions represent (x,y, time) coordinates as well as depth of the elements of the kernel.

26. The method of claim 21, further comprising:
partitioning each operation for pattern classification among the plurality of hardware engines, wherein each hardware engine is configured to perform a sub-task of the operation in parallel.

27. The method of claim 26, further comprising:
replicating a sub-task among multiple tensor engines or moving a sub-task from one tensor engine to another for efficient use of compute resources.

28. The method of claim 21, further comprising:
performing one or more of: multiplication between a dense vector or matrix and a dense matrix, multiplication between a sparse vector and a dense matrix, and multiplication between a sparse vector and a sparse matrix, wherein a sparse vector or matrix has more zero elements than nonzero elements, while a dense vector or matrix has more nonzero elements than zero elements.

29. The method of claim 21, further comprising:
reducing the number of times the input data and a weight matrix need to be read at the at least one or more layers of the neural network and wherein the number of times the output matrix needs to be written at each layer the at least one or more layers of the neural network is once.

30. The method of claim 21, further comprising:
reducing data movement associated with multiplication involving a sparse vector, wherein only data that corresponds to non-zero values in the sparse vector is loaded into the memory of the tensor engine upon request.

31. The method of claim 21, further comprising:
reusing data in the memory across one or more of the convolutional network engines efficiently to reduce data movement for read and/or write to memory during the convolution operations.

32. The method of claim 31, further comprising:
keeping and repeatedly applying a same kernel on different parts of the input data at each layer the at least one or more layers of the neural network wherein the kernel is loaded into the memory only once during the convolution operations.

33. The method of claim 31, further comprising:
applying different kernels to the same portion of the input data at the at least one or more layers of the neural network, wherein that specific portion of the input data has already been loaded into the memory and does not need to be reloaded again during the convolution operations.

34. The method of claim 31, further comprising:
saving and reusing convolution output by a kernel on an overlapping part of two portions of the input data without calculating the output again at one or more convolution layers when the kernel is applied to the two portions of the data in stride and the two data portions overlap.

35. The processor of claim 1, wherein in a vector-matrix multiplication operation the vector is read only once by reusing data.

36. The processor of claim 1, wherein the input data is a portion of an image, and wherein a size of the input data matches an input width of with each hardware engine.

* * * * *